Sept. 8, 1953 — F. A. PRIESTLEY — 2,651,091
EDGE TO EDGE FASTENING
Filed July 30, 1947 — 3 Sheets-Sheet 1
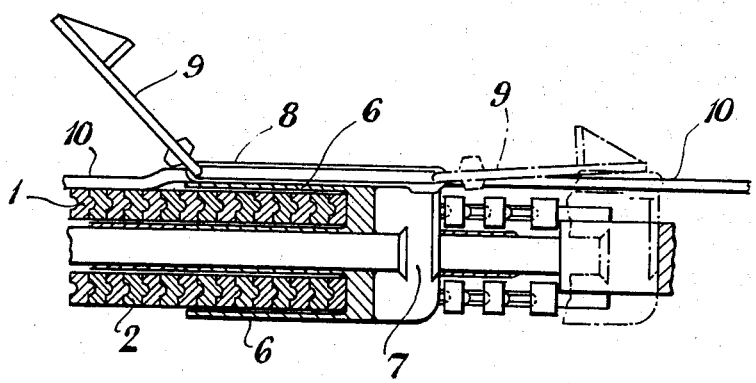
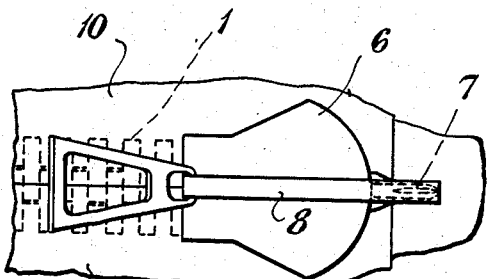
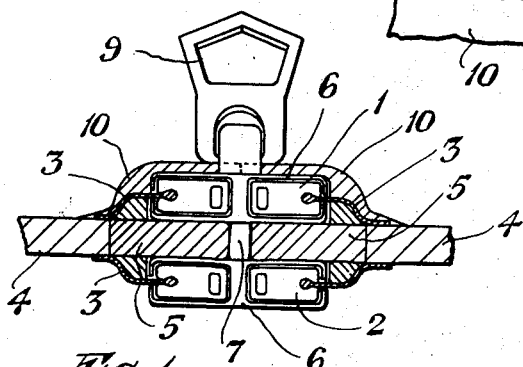
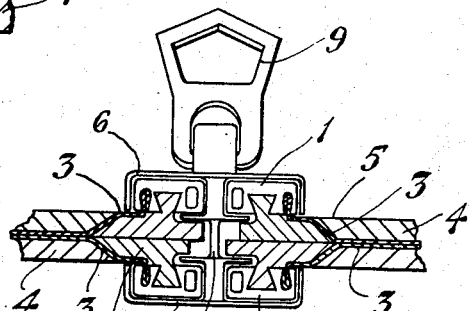
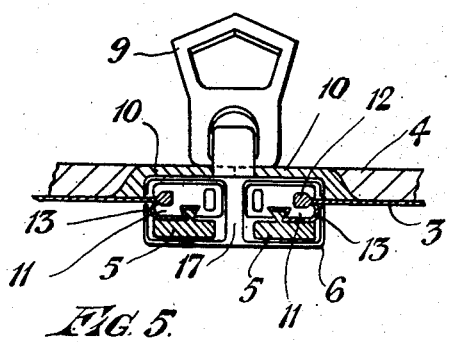

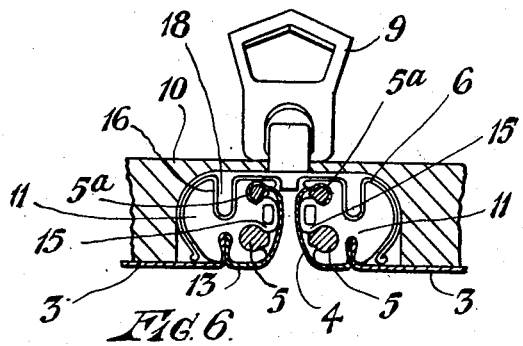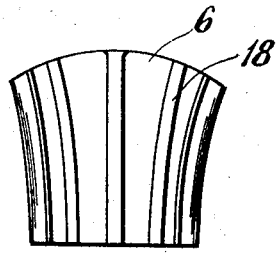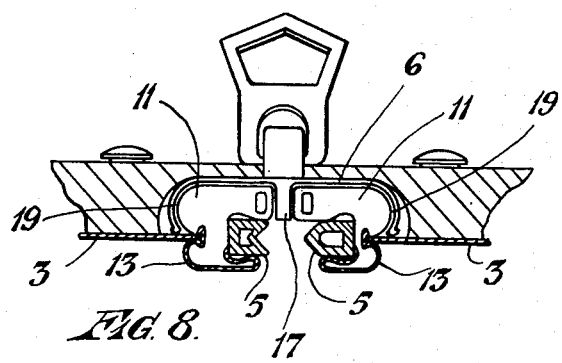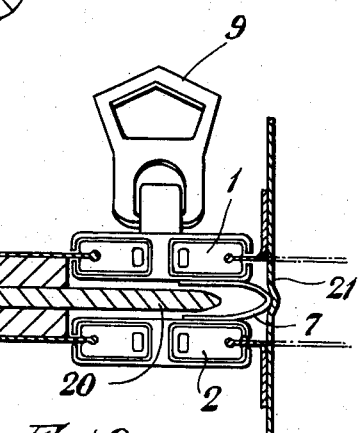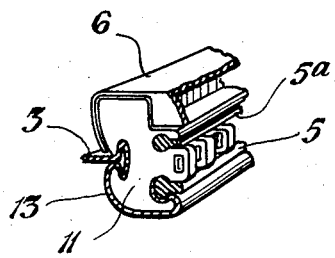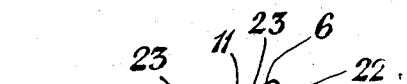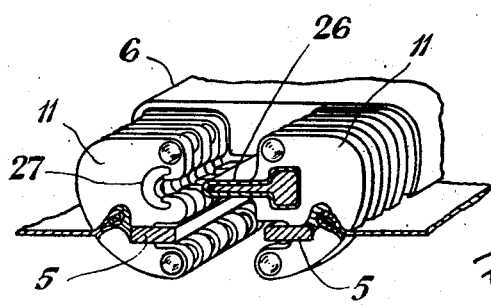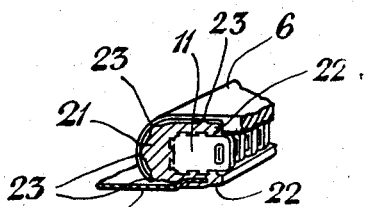

Sept. 8, 1953  F. A. PRIESTLEY  2,651,091
EDGE TO EDGE FASTENING
Filed July 30, 1947  3 Sheets-Sheet 3

Frederick Alfred Priestley

Patented Sept. 8, 1953

2,651,091

UNITED STATES PATENT OFFICE 2,651,091

EDGE TO EDGE FASTENING

Frederick Alfred Priestley, London, England

Application July 30, 1947, Serial No. 764,695
In Great Britain January 28, 1943

Section 1, Public Law 690, August 8, 1946
Patent expires January 28, 1963

1 Claim. (Cl. 24—205.1)

The present invention relates to edge-to-edge fastenings and more particularly though not exclusively to edge-to-edge fastenings of the tin and box type sometimes known as the "Zip" (registered trade-mark).

Whilst this type of fastening has many uses such, for example, as on garments, cases and covers, the fastenings in common use have the great drawback that they are not watertight and gastight. It has been proposed to provide an edge-to-edge fastener with abutting strips for the purpose of making a joint proof against fluids, but such a joint is somewhat clumsy and its manipulation requires a separate closing of two rows of fastenings. In many circumstances, such for example on clothing, this is very inconvenient and even impossible.

It is an object of the present invention to provide an improved substantially fluidtight joint in conjunction with an edge-to-edge fastener which joint can be opened or closed by manipulation of only one grip.

A further object of the present invention is to provide an edge-to-edge fastener having the above characteristics which is more compact and which is more pleasing in appearance.

Yet a further object of the invention is to provide on such fasteners an improved slide for opening and closing the joint.

According to one aspect of the present invention an edge-to-edge fastener includes two pairs of rows of interlocking teeth having between them two strips or like longitudinal members mounted upon the stringers carrying the teeth so as to provide a fluidtight union therewith, said strips being adapted on closing of the two rows of interlocking teeth to abut and compress to form a fluidtight joint, a slide on each pair of rows adapted on longitudinal movement to lock and unlock the teeth in known manner, said slides being connected by a web-member passing between the said strips and so shaped as to form a watertight joint between the two strips when the edge-to-edge fastener is closed. When the edge-to-edge fastening is employed on slit closures the web member seats between two soft rubber facings on the longitudinal members when the fastener is in the closed position which facings are pressed against the web-member by the slides pressing laterally against the ends or stops on the ends of the rows of interlocking teeth.

Such a watertight edge-to-edge fastener can be mounted upon a garment or cover and be closed by means of a single grip provided upon the outer slide member.

According to a further aspect of the present invention the teeth of an edge-to-edge fastener, of the type referred to, have mounted upon or carried in the said teeth longitudinal members for example strips which when the fastening is closed abut and compress to form a watertight joint.

Preferably the longitudinal members forming the watertight joint are made from some flexible yielding water-resistant material such as rubber or artificial rubber. Alternatively, one of the longitudinal members may be flexible but non-yielding for example steel strip and adapted to press against a flexible and yielding longitudinal member to form the waterproof joint.

It is an important aspect of the present invention that the stringer, which is, of course, waterproof, upon which the teeth are mounted is continued round the teeth to form with the longitudinal member or members a continuous, impervious joint with the material to which the fastener is attached.

The invention will now be described with reference to the accompanying drawings in which further aspects of the invention will be apparent;

Figure 1 shows in section one form of fastener according to the present invention;

Figure 2 shows in longitudinal section the fastener shown in Figure 1;

Figure 3 shows a plan of the fastener shown in Figures 1 and 2 in the closed position;

Figure 4 shows an alternative construction to Figure 1;

Figure 5 shows in section a fastener according to another aspect of the invention;

Figure 6 shows in section an alternative form of fastenings to that of Figure 5 and embodying a dustproof device and an improved form of slide;

Figure 7 shows a plan view of the slide;

Figure 8 shows another form of fastener according to the invention in cross-section;

Figure 9 shows an adaption of the fastener shown in Figure 1 to form a watertight junction or T-joint;

Figure 10 shows a perspective view of one row of coupling members embodying the present invention;

Figure 11 shows a perspective view of a further form of tooth embodying the present invention;

Figure 12 shows in perspective two rows of interlocking teeth embodying a further aspect of the invention;

Figure 14:
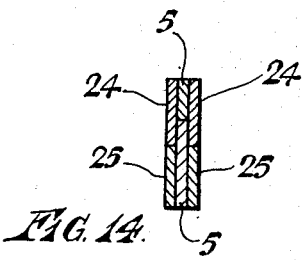
Figure 14 shows a section on the lines XIV—XIV of Figure 13.

Referring to Figures 1 to 4 there are provided two pairs of rows of edge-to-edge fastenings of the "Zip" (registered trade-mark) type 1 and 2. These are mounted in the usual manner upon stringers 3 and the stringers are sewn or otherwise secured upon either side of both edges of the opening in the material 4. Between each pair of rows 1 and 2 there is secured in a watertight manner to the respective stringers 3 two rubber strips 5—5. The outer edge of these strips may extend to a point level with the front edge of the teeth of the edge-to-edge fastenings. The extent to which the outer edge projects depends upon the degree of interlocking of the teeth and the degree of yield of the material of the strip. Furthermore, the strips may be asymmetrically disposed with respect to the teeth.

Each pair of rows of fastenings is provided with a slider 6—6 of conventional form for the purpose of interlocking and unlocking the teeth of the fastener, but they are joined by a connecting web 7. This web 7 is of flat cross-section, having tapering edges and runs freely between the strips 5—5. The outer slider 6 is provided with an elongated slot 8 in which runs a suitable pull or grip 9. The provision of this slot 8 enables any tendency of the underslide 6 to twist or distort to be counteracted by pressure of the thumb or finger upon the top of the slot 8. Thus, in Figure 2 in which the left-hand end shows the fastenings in closed position and the right-hand end in the open position the pull or grip 9 is held in the position shown in full line during the opening operation and in the position shown in chain line when the fastening is being closed.

In order to hide the fastening and also to provide it with a dust-cover there may be secured to the outer stringers 3—3 rubber or similar flaps 10—10 between which the slot 8 protrudes but which in the closed position abut on the top of the fastenings.

In the closed position the two strips 5—5 are closed together by the fastenings 1 and 2 and are held in abutment and under compression to provide a completely watertight joint. This is so because there is always, and in whatever position assumed by the joint as a whole, compression applied on either side of the strips 5—5 by the two rows of fastenings 1 and 2.

An important point in the construction of this fastener is that the stringers 3 and the strips 5 are bonded together in a watertight and gastight manner and provide a direct lateral pull to the couplings in engagement on both sides of the fastening under the action of the sliders.

At the end of the closure accommodating the web 7 and particularly in linear and curvilinear slit closures when the fastening is closed the strips 5—5 are compressed closely against either side of the web 7 which is caused to be suitably embedded in a seating at the stop or rack end of the slit closure by pressure of the slide 6 laterally against the ends of the rows of interlocking members 1 and 2. Conveniently, although not shown, the slides 6—6 may be retained in the closed position by means of a suitable locking device such as a catch, hook-and-eye or the like.

Referring to Figure 4 the fastenings 1 and 2 carry on their lower edges the strips 5—5 which form a rebated joint when in compression, and which are operated in exactly the same manner by slides 6—6 as described with reference to Figures 1 to 3. The difference lies in the keying of strips 5—5 into the teeth 1 and 2 instead of having the teeth and strip free for movement with respect to one another. Conveniently, the stringers 3 may be rubberized and bonded with the rubber strips 5—5 by a vulcanizing operation and material of the garment made to adhere to them as necessary.

In Figure 5 there is shown a complete departure from certain prior proposals for a waterproof "Zip." In this embodiment the teeth 11—11 which interlock in accordance with the "Zip" (registered trade-mark) principle have keyed into their lower edge a rubber strip 5 in order to provide a watertight union between the strip 5 and the stringer 3 the stringer 3 after being secured to the teeth 11 by the conventional beading 12 is provided with an extension 13 passing round the underside of the teeth 11 to be bonded to the strip 5. The slider 6 which is provided with the conventional wedge member 17 for displacing the teeth during locking and unlocking is secured in the closed position to provide a watertight joint in the same manner as the web member 7 of Figures 1-3.

Figure 6 shows an alternative construction of tooth embodying four compressible strips. In this case the main strips 5—5 are counterbalanced by smaller strips 5a—5a placed on the opposite side of the interlocking portion of the teeth 11. Thus, when closed, the strips 5—5 and 5a—5a are brought into abutment and under compression and serve to prevent either pair tending to twist the fastening about the teeth. In this embodiment the strips are shown as rubber thread of heavy count compressed into suitable arcuate apertures in the teeth 11. Rubber thread lends itself readily to its assembly into the teeth since if slightly oversize rubber thread is employed it is automatically retained in the apertures and in addition provides a projecting portion 14 which serves as the abutting face to form the joint.

In this construction there is also shown a skin or pellicule 15 conveniently formed of thin, tough, rubber sheeting which is bonded to the extension 13 of the stringer 3 and passes over the teeth 11 to be bonded along its other edge to the rubber thread 5a forming the upper compression strip. This pellicule completely covers the interlocking portions of the teeth 11 but is flexible and tough enough to allow the teeth to interlock to form the closure. At the same time, it prevents sand or other foreign matter penetrating into the interstices between the teeth and so preventing operation of the closure.

In this embodiment there is also shown an alternative form of slider 6. In the place of the conventional web as, for example, 17 shown in Figure 5 which serves to displace the teeth on locking and unlocking the teeth 11 are provided with an arcuate rear edge round which the slider 6 is shaped to be retained thereby and are also provided with a grooved track 16 in which runs a finger 18 provided on the underside of the upper face of the slider 6.

Referring to Figure 7 the finger 18 is so shaped as to cause the teeth 11 to be appropriately displaced to permit of locking and unlocking of the teeth 11 on longitudinal movement of the slider 6 by means of the conventional grip or pull 9.

Figure 8 shows an alternative form of the strips 5—5 and in this case these are hollow and the left-hand strip 5 is provided with a V-recess into which fits under compression a correspondingly contoured face on the right-hand strip 5. Furthermore, the slider 6 is not provided with a wedge passing right through between the rows of teeth 11 but the wedge 17 in this case, only extends between the interlocking portion of the teeth 11, and the slider 6 is retained in position by the arcuate formation 19 of the teeth 11. It will be noted that the extension 13 of the stringer 3 is carried round the lower edge of the teeth 11 to be bonded to the strips 5—5. Figure 9 shows an adaptation of the type of fastener shown in Figures 1–4 to form either a T-joint or horizontal joint or a joint of any varying angle within 180° radius. In this case, in the place of the strips 5—5 a tapering member 20 is adapted upon closing of the fasteners 1 and 2 to be forced into contact with the material 21 which conveniently is rubberized to form a waterproof joint. Instead of the web member 7 being straight it is of U-formation to circumvent the tapering member 20 and is held firmly between the member 20 and the material 21 to form a waterproof joint in the closed position in the same manner as is described with reference to the web 7 in Figures 1–4.

Figure 10 shows in perspective a section of one row of a pair of interlocking "Zip" fasteners showing the respective positions of the strips 5 and 5a which operate in the same manner as is described with reference to Figure 6. As an alternative, however, to ordinary round thread being employed the strips 5 and 5a are of moulded T-section.

Figure 11 shows a perspective of a section of a row of "Zip" teeth in which the teeth 11 are bedded into a surrounding flexible moulding 21 the forward edges of which 22—22 form the abutting compression joint. The surrounding moulding 21 may be of soft vulcanized rubber and provided with portions 23 which stand proud of the general moulding and are hard vulcanized to form a bearing for the slider 6 to run upon, this slider being formed as is described with reference to Figure 8.

Figure 12 shows in addition to the compression strips 5—5 the incorporation of a flexible tube member 26 which upon the fastening being closed projects into and fills a corresponding open aperture 27 in the opposite row of teeth. This tubular member 26 may be of sufficient internal cross-sectional area for the portion occupying the aperture 27 to be pressed out to conform to the shape of the aperture 27 or to be inflated under air, oxygen or such gas in compression and applicable to pressure suits for the use of airmen in stratosphere flying and thus providing a completely watertight and airtight joint in addition to the compression joint formed between the strips 5—5.

Figure 13:
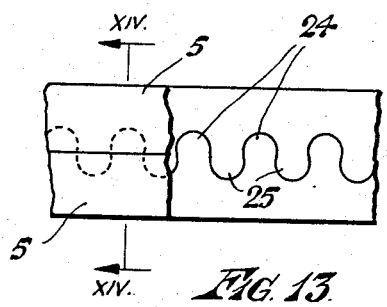
Figure 13 shows an alternative form of tooth to which the present invention can be applied.

Figures 13 and 14 show the adaptation of the abutting joints to an edge-to-edge fastener of a type other than a "Zip." In this case the engaging teeth comprise arcuate fingers 24 and 25 two rows of which are provided between which are sandwiched two compressible strips 5—5 which abut under compression when the joint is closed in the manner described with reference to the previous figures.

Figure 15:
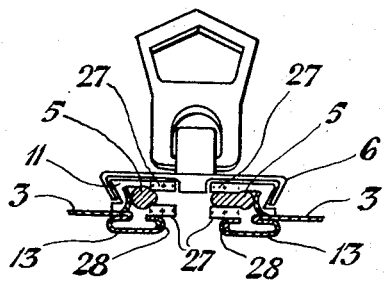
Figure 15 shows in cross-section an edge-to-edge fastener embodying further features of the invention.
Figure 16:
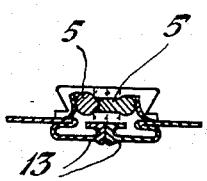
Figure 16 shows in cross-section the fastener in the closed position.

Figures 15 and 16 show the use of strips 5—5 asymmetrically disposed. In this case, the strip on the left-hand side is set well back in the teeth 11 and the strip 5 on the right-hand side juts forward. This strip on the right-hand side may be of flexible but non-yielding material which beds against the soft vulcanized thread 5 on the left side. Such an arrangement lends rigidity to the joint when closed since the right-hand member passes between the interlocking portions 27 of the teeth 11. The extension 13 of the stringer 3 may be applied loosely to the front 28 of the teeth 11 so as to form a subsidiary abutting joint as shown in Figure 16.

Figure 17:
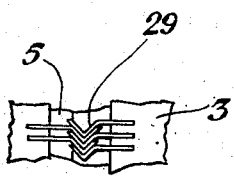
Figure 17 shows an alternative form of tooth incorporating the present invention.

These teeth 27 need not assume the conventional shape of the "Zip" type fastener but may be as shown in Figure 17 formed from strip material punched at 29 into V-formation. Such a shape of tooth enables economic production and sufficient rigidity is imparted by the employment of two rows of fastenings.

Figure 18:
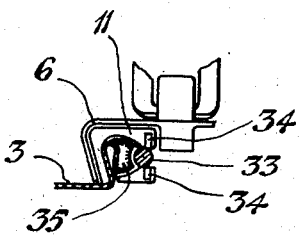
Figure 18 shows one method of employing ordinary round rubber threads as the longitudinally sealing member.

Figure 18 shows a method of cutting existing teeth provided with elongated interlocking members. The members 11 are, before cutting, provided with elongated interlocking portions and a slot 33 is cut to receive the member 5. This forms two interlocking portions 34, 34 with the sealing strip 5 between them. In this case the stringers 3 are not provided with extensions to join with the member 5, but instead, the side faces of the members 11 are provided with raised flats 35 of rubber or other yielding material which extend from the stringer heading in the member 11 to the member 5. These flats abut under compression against the flats on adjacent teeth to form a fluidtight seal.

Figure 19:
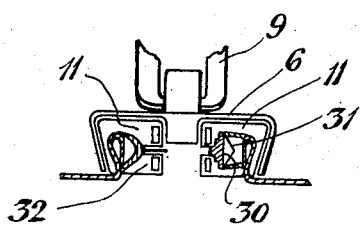
Figure 19 shows yet another construction of a watertight edge-to-edge fastener according to the present invention.
Figure 20:
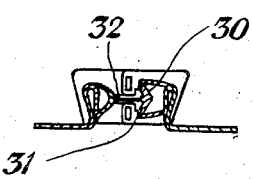
Figure 20 shows the fastener shown in Figure 19 in the closed position.

Figures 19 and 20 show yet a further application of a compression joint. In this case the tooth 11 is so shaped as to enable a membrane 30 to be disposed across a suitable opening 31 which membrane is displaced and placed under tension by means of a flexible but non-yielding member 32 fixedly secured in the opposing tooth. As shown in Figure 19 when the fastening is open the membrane 30 stretches in a straight line across the aperture 31, but when closed as shown in Figure 20 the member 32 presses against the membrane 30 and displaces same and may, if desired, press it in compression against the rear edge of the aperture 31.

It will be realized that the embodiments shown in the accompanying drawings are but examples of the many ways of incorporating a compression joint into an edge-to-edge fastener and the scope of the invention is intended to cover the compression of two members, one on each row of interlocking fastening to form a fluidtight joint.

Similarly, whilst for many purposes the interlocking teeth may be made of suitable metal it will be realized that they can equally well, and for suitable purposes, be formed from other material, for example, artificial resins, vulcanite, or other material resistant to wear and adapted to form a firmly interlocking joint of sufficient strength to maintain the two abutting faces forming the watertight joint under compression.

The fluidtight fastener of the present invention has particular application to life saving suits since whilst providing a rapid closure when donning the suit it also provides a watertight closure for the suit and even under prolonged immersion a suit made of waterproof material and provided with the closures of the present invention would protect the wearer from direct immersion in the water.

What I claim is:

A separable fastener comprising in combination, oppositely disposed stringers; two rows of interlocking zipper elements, one carried by each of said stringers, each of said zipper elements having two spaced lock portions at its engagement face; aligned recesses formed in each of said rows of zipper elements for receiving the edges of said stringers, the said recesses being laterally open towards the adjacent zipper elements of the same row; a slot extending from each of said recesses to the engagement face of the zipper element; a sealing strip provided in the said slots of each row of zipper elements; and sealing portions of yieldable material provided at the lateral faces of said zipper elements so as to cover the said lateral openings of said recesses and so as to engage with the sealing portions of the adjacent zipper elements.

FREDERICK ALFRED PRIESTLEY.

References Cited in the file of this patent

UNITED STATES PATENTS

| Number | Name | Date |
|---|---|---|
| 1,734,434 | Hutchins | Nov. 5, 1929 |
| 1,839,068 | Wascheczeck | Dec. 29, 1931 |
| 2,066,060 | Sipe | Dec. 29, 1936 |
| 2,289,586 | Marinsky et al. | July 14, 1942 |

FOREIGN PATENTS

| Number | Country | Date |
|---|---|---|
| 214,594 | Switzerland | of 1941 |